United States Patent [19]

Bouchard et al.

[11] Patent Number: 5,000,053
[45] Date of Patent: * Mar. 19, 1991

[54] APPARATUS FOR INCREASING SUSPENSION STIFFNESS IN A GYRO

[75] Inventors: John R. Bouchard, Canton; John R. McNeil, Weston, both of Mass.

[73] Assignee: Northrop Corporation, Los Angeles, Calif.

[*] Notice: The portion of the term of this patent subsequent to Mar. 10, 2004 has been disclaimed.

[21] Appl. No.: 227,842

[22] Filed: Aug. 3, 1988

Related U.S. Application Data

[63] Continuation-in-part of Ser. No. 3,952, Jan. 15, 1987, abandoned, which is a continuation-in-part of Ser. No. 617,228, Jun. 4, 1984, Pat. No. 4,648,284.

[51] Int. Cl.$^5$ .................... G01C 19/20; G01C 19/24; G01C 19/28
[52] U.S. Cl. ........................ 74/5.46; 74/5.5; 74/5.6 E
[58] Field of Search ............... 74/5.6 E, 5.5, 5.46; 310/90.5

[56] References Cited

U.S. PATENT DOCUMENTS

| | | | |
|---|---|---|---|
| 3,146,038 | 8/1964 | Lautzenhiser | 310/90.5 |
| 3,261,210 | 7/1966 | Buchhold | 310/90.5 X |
| 3,475,971 | 11/1969 | Binder et al. | 74/5.6 E |
| 3,787,100 | 1/1974 | Habermann et al. | 74/5.6 E X |
| 3,860,300 | 1/1975 | Lyman | 310/90.5 |
| 4,211,452 | 7/1980 | Poubeau | 310/90.5 |
| 4,316,394 | 2/1982 | Dohogne | 74/5.6 E X |
| 4,444,444 | 4/1984 | Banedetti et al. | 310/90.5 |
| 4,585,282 | 4/1986 | Bosley | 310/90.5 |
| 4,648,284 | 3/1987 | Bouchard et al. | 74/5.46 |

Primary Examiner—Rodney H. Bonck

[57] ABSTRACT

Suspension stiffness about the input axis of a gyro is increased by selectively disabling suspension legs when the gyro float exceeds a predetermined deviation away from the equilibrium position. Float position may be measured directly or inferred from monitoring currents in the electromagnetic suspension system. Suspension legs are re-energized when the float returns to within the predetermined deviation from the equilibrium position.

12 Claims, 2 Drawing Sheets

APPARATUS FOR INCREASING SUSPENSION STIFFNESS IN A GYRO

CROSS-REFERENCES TO RELATED APPLICATIONS

This application is a continuation-in-part of Ser. No. 07/003,952, filed Jan. 15, 1987, now abandoned, which is a continuation-in-part of Ser. No. 06/617,228 filed June 4, 1984, now U.S. Pat. No. 4,648,284 issued Mar. 10, 1987, and assigned to the same entity as the present application.

BACKGROUND OF THE INVENTION

The present invention relates to suspensions for single degree of freedom gyroscopes and more particularly to apparatus for increasing suspension stiffness affecting rotational deviation or displacement about the input axis of such a gyro and utilization of the existing suspension hardware to provide a means of readout of any residual angular misalignment.

Single degree of freedom gyros are used to control and stabilize platforms to point optical and other devices through extremely great distances in tracking and pointing applications. It is essential that the rate signals emanating from these instruments be extremely steady as any "jitter" will result in a blurring effect. This gyro error phenomenon is referred to generally as noise. In addition to the stabilizing function, another important requirement for this type of instrument is that it must be capable of being commanded to rotate to different positions at fairly high angular rates, and when the new position has been reached, the time to return to equilibrium (for a constant pointing signal) must be minimal.

Many single degree of freedom gyros include a gyro wheel mounted within a "float" which floats in a viscous fluid inside an outer case. The more sophisticated single degree of freedom gyros employ electromagnetic suspensions to position the float within the case of the gyro without actual physical contact. The operation of such a suspension is described in U.S. Ser. No. 617,228 filed June 4, 1984, and now U.S. Pat. No. 4,648,284 issued Mar. 10, 1987, and assigned to the same entity as the present application, and its teachings are incorporated herein by reference. The invention of that application has to do with suspension forces along the output axis of the gyro. In U.S. Pat. No. 4,648,284 during instrument warm up or turn on, the float tends to move axially in a direction along the output axis of the gyro. The invention of U.S. Pat. No. 4,648,284 is thus concerned in utilizing an active mode in more rapidly restoring the float to an equilibrium position along the output axis.

As will also be appreciated by those skilled in the art, the float in a single degree of freedom gyro during maneuvers tends to rotate or be displaced about the input axis IA. Consequently, true angle indication after such displacement is not possible until the suspension again reaches its equilibrium (centered) position about the input axis. It is thus highly desirable to employ suspensions having maximum stiffness with respect to movement or displacement about the input axis. To the extent the float has not returned to its equilibrium position after a maneuver, a proportionate pointing angle error exists. Also, the greater amount of time during which the float is returning to its equilibrium position, the greater amount of time is consumed before which pointing accuracy can be achieved. The heavy viscous damping of the fluid in which the float resides is a factor which resists rapid recentering. Increasing suspension stiffness thus will decrease the amount of time consumed in restoration to the equilibrium or centered position.

Increasing suspension stiffness will also increase the maximum slew rate of a single degree of freedom gyro. Frequently the maximum rate within which a gyro can perform is limited by the suspension "bottoming out" with respect to the output axis against its radial stops. Increasing suspension stiffness which results in higher slew rates will have application during gyro compassing. One method of gyro compassing involves rapid slew about the output axis of the gyro through 180°. In order to gyrocompass by case rotation, the input axis pointing direction is redirected 180 degrees. This is accomplished by rotating about either the spin axis or about the output axis. Because of the gyroscopic effect, larger torques are involved when rotating about OA than when rotating about SA. Despite this disadvantage of the greater torque, rotation is usually accomplished by rotating about a vertical output axis for the reason that drift uncertainty is superior in this attitude. Thus performance (response time) is improved by a stiffer suspension.

Another problem area of single degree of freedom gyros results when there is an unrecognized angular displacement about the input axis between the float and the case. This is the small angle that remains when the float is near its equilibrium position. It is thus desirable to have precise knowledge of the extent to which the float is not in its equilibrium, or precise pointing position.

It is therefore an object of the present invention to increase suspension stiffness with respect to movement or displacement about the input axis of a gyro.

It is another object of the invention to increase suspension stiffness in a gyro by making a direct measurement of float radial position by utilizing information provided by the suspension currents.

It is yet another object of the invention to provide an increase in suspension stiffness which will increase the slew rate capability of the gyro.

A still further object of the invention is to derive accurate angle information for any residual float angle deviation from the equilibrium position in a gyro to provide a precise indication of error angle.

SUMMARY OF THE INVENTION

These and other objects of the invention are achieved by selectively disabling opposing radial legs of the electromagnetic suspension when the float position deviates beyond a predetermined amount from an equilibrium position. In a preferred embodiment, electrical current to the electromagnetic suspension is monitored as an indication of float position. Thus, when current in a suspension leg exceeds a predetermined value, (indicating the float has moved away from its equilibrium position), an active correction mode is begun and the opposing suspension leg is de-energized to provide maximum centering force. When the remaining suspension leg has again brought the float to near equilibrium position in the active correction mode, a logic device or processor returns the suspension system to a normal operating passive mode by re-energizing the opposing leg. Alternatively, a direct measurement of float position may be used for deactivating and reactivating the opposing suspension leg. Furthermore, the differential voltage across the suspension leg pair can be calibrated for float angle deviation from equilibrium position. The same microprocessor that is used in controlling deactivation of the suspension from the passive operating mode to the active correctional mode and of reactivation of the suspension to the passive operating mode can also be utilized to interpolate the output suspension position signal into a precise indication of error angle, which can then be utilized as a correction factor in the overall pointing system.

BRIEF DESCRIPTION OF THE DRAWING

The invention disclosed herein may be better understood with reference to the following drawing which.

DESCRIPTION OF THE PREFERRED EMBODIMENT

Figure 1:
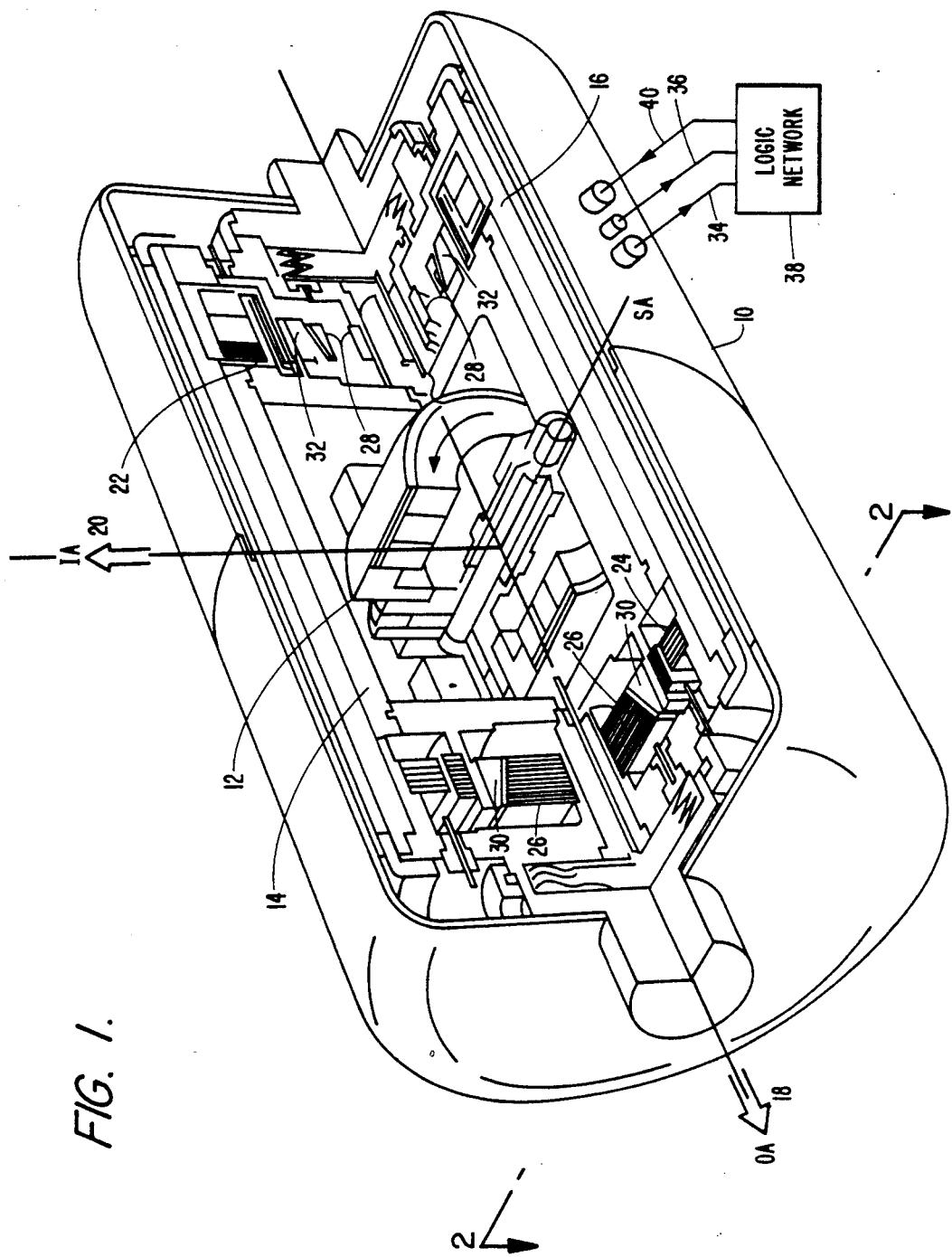
FIG. 1 is a perspective view with parts broken away of a single degree of freedom gyroscope utilizing the present invention.

With reference first to FIG. 1 of the drawing, a single degree of freedom gyro 10 includes a gyro wheel 12 supported for rotation in the direction of the arrow within a float 14. The float 14 is floated in a viscous fluid contained within a case 16 of the gyro 10. The float 14 is supported within the case 16 for rotation about the output axis 18. In operation, angular rates of the gyro case 16 about the input axis 20 will tend to cause the float 14 to rotate about the output axis 18 because of the spinning of the gyro wheel 12. The tendency to rotate about the output axis 18 is opposed by torques generated by a torque generator 22. A signal generator 24 is responsive to angular rotations about the output axis 18 and is used in a closed-loop fashion to maintain the float 14 at a null orientation about the output axis 18.

Figure 2:
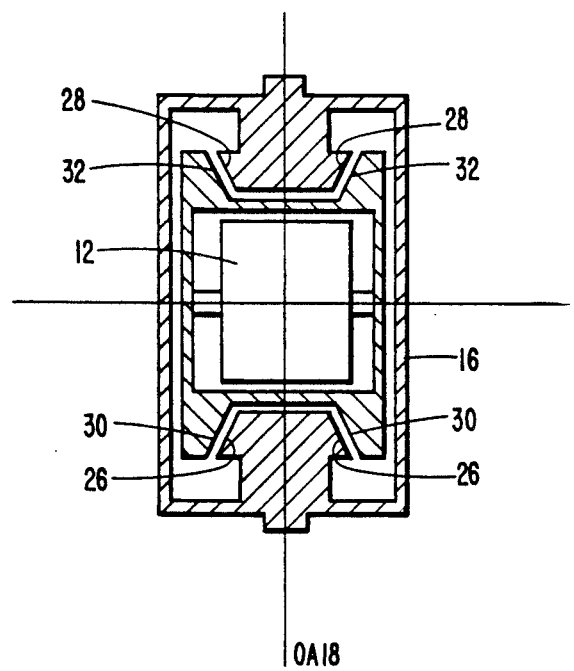
FIG. 2 is a schematic sectional view along the lines 2—2 of FIG. 1 schematically illustrating the float and bearing arrangement in the equilibrium, centered position
Figure 3:
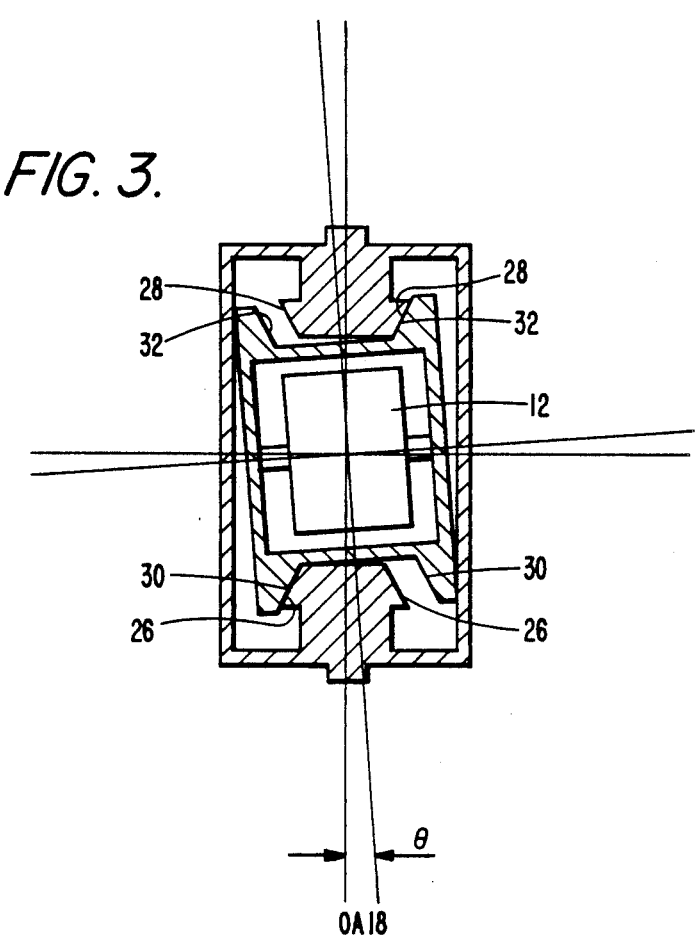
FIG. 3 is a schematic sectional view along the lines 2—2 of FIG. 1 schematically illustrating the float and bearing arrangement in the position of the float deviated in its position from alignment with the bearing arrangement.

Since the float 14 is floated in a fluid disposed between the float 14 and the case 16 of the gyro 10, additional suspension apparatus is provided to keep the float 14 from coming into contact with the housing 16. The additional suspension is provided by electromagnetic bearing arrangements located at either end of the case as schematically illustrated in FIG. 3. The electromagnetic bearing arrangements are provided by interaction of a series of electromagnets mounted on the case 16 with magnetically permeable rings mounted on the float 14. In particular, electromagnets 26 and 28 are rigidly mounted with respect to the case 16 of the gyro 10. The electromagnets 26 and 28 have a tapered configuration to interact with tapered magnetically permeable rings 30 and 32 mounted on the ends of the float 14. Because the electromagnets and rings are tapered, longitudinal forces along the output axis 18 and radial forces about the input axis 20 are generated. It is the radial centering forces resulting from relative float to case misalignment or rotation about the input axis as schematically illustrated in FIGS. 2 and 3 with which the present invention is primarily concerned. Both rotation about the input axis (because of angular acceleration) and rotation about the output axis (because of the gyroscopic effect) cause relative misalignment between the float and the case. In actuality, rotation about the output axis is of an order of magnitude more severe in impact than rotation about the input axis. Thus, as will be appreciated by those skilled in the art, the gyro float will tend to become angularly misaligned about IA with respect to the gyro case as the gyro case 16 rotates about the output axis 18, (because of gyroscopic effect) or as the case rotates about the input axis 20 (because of the inertia float 14). In particular, a rotation about the input axis 20 will tend to increase or decrease the gap between the electromagnets 26 and 28 and the magnetically permeable rings 30 and 32 as schematically illustrated in FIG. 3.

A brief explanation of the electromagnetic suspension will aid an understanding of the present invention. The electromagnets 26 and 28 are tuned with capacitors to be on the inductive side of resonance. As the gap between a particular segment of electromagnet 26 or 28 and the associated magnetically permeable ring 30 or 32 increases, inductive and capacitive reactance more nearly cancel allowing the total impedance to become purely resistive, i.e., resonance. This arrangement permits a higher current to flow in the particular segment of electromagnet 26 or 28 in which the gap is largest, and thus causes an increase in the attractive force between the magnetically permeable tapered ring, 30 or 32 and the segment of electromagnet 26 or 28 as the gap increases. A similar relationship applies to other segments of the electromagnet 26 or 28. Those segments which are diametrically opposed to those segments for which the gap increases will have a corresponding decrease in gap as schematically illustrated in FIG. 3. Thus, as the float 14 rotates about the input axis 20, the gap between one segment of the electromagnet 26 and magnetically permeable ring 30 increases and the diametrically opposed gap between the opposite segment of electromagnet 26 and magnetically permeable ring 30 decreases. The larger gap results in higher current flow and hence a larger attractive force, and the decreased gap results in lower current flow and decreased attraction. The suspension at the other end of the float 14 involving the electromagnet 28 and ring 32 undergoes a similar but complementary displacement in response to rotation of the float 14 about the input axis 20.

The electromagnetic suspension therefore exerts forces upon the float 14 in a manner similar to a mechanical equivalent of opposing springs if schematically substituted for the electromagnets, each pulling in the opposite direction and causing a net centering force in the radial direction that is proportional only to the difference between the opposing forces. Because the suspension is analogous to opposing springs, the suspension is often referred to as "passive." Since the net centering force is proportional only to the difference between the two opposing forces it is small and diminished in magnitude especially as the float approaches the equilibrium position. Furthermore, since the relatively small and diminished centering forces are opposed by the relatively large piston-type damping due to the viscous drag of the fluid, significant time is required for the float to reach equilibrium after displacement. As stated above, pointing errors arise when the float is displaced and is not centered It is thus highly desirable to increase the suspension stiffness to speed up float centering so as to decrease pointing errors.

The gyro 10 has a float position read-out signal 34 which indicates float 14 deviation or radial position. A current level signal 36 is also provided which is a measure of the current levels in the electromagnets 26 and 28. Both of the signals 34 and 36 are derived from the current being supplied to the suspension. The radial position signal is derived from an isolation transformer that differences voltage generated from opposing suspension segment currents. Both the signals 34 and 36 enter a logic network 38. The logic network 38 communicates with the gyro 10 via a signal path 40 and controls current to the suspension.

The present invention is based on a recognition that suspension stiffness can be increased if the suspension is operated in an "active" mode during which opposing legs of the suspension system are de-energized when the float deviates more than a predetermined deviation or movement from the centered or equilibrium position. Suppose, for example, that the float 14 is displaced about the input axis relative to the case 16 through an angle $\phi$ so that the gap between one segment of electromagnet 26 and the magnetically permeable ring 30 decreases as does the gap between one segment of electromagnet 28 and ring 32. Displacement of the float 16 through the angle $\phi$ relative to the output axis and the case is the angle of pointing error which results. The current, and hence attractive force, in the diametrically opposed electromagnet segments will increase tending to restore the float position to equilibrium. In the passive mode there will still be a force, albeit diminished, between the magnet and ring which opposes this centering force. According to the present invention, the segment of the electromagnet 26 and complementary segment of 28 would be disabled so as not to oppose the centering force provided by the diametrically opposed segments. When the float is restored to within a predetermined limit from equilibrium, the respective electromagnet segments 26 and 28 would be re-energized thus returning the suspension to the "passive" mode. Returning to the analogy of the float being suspended between diametrically opposing springs, when the float is far from equilibrium one of the springs is then disconnected to increase the net centering force. To summarize, according to the present invention, the suspension is operated in a "passive" mode until a deviation or displacement of the float beyond a predetermined deviation from equilibrium about the input axis and relative to the case is sensed and is then responsively switched to an "active" mode during which complementary suspension legs are disabled and switched back to a "passive" mode in which the complementary suspension legs are re-energized when the float is within the predetermined deviation from the equilibrium position.

It will be appreciated that the present invention may be implemented either by utilizing the direct radial position read-out signal indicated at 34 or by inferring float position from the suspension current level signal 36. The use of the suspension current level signal 36 to infer float position eliminates the need to have a position signal 34 available.

As discussed above, changes in the gap width between the electromagnet 26 and the magnetically permeable ring 30 and electromagnet 28 and ring 32 induce current changes. The logic network 38 continuously monitors the current level signal 36 which measures current to the electromagnetic suspensions. When a particular suspension leg exceeds a preset value of current thus indicating the float has moved away from its equilibrium position, the opposing suspension legs are de-energized to an "active" correction mode to provide maximum centering force. When the float has been restored to the near equilibrium position by the "active" correction mode, the logic network 38 returns the suspension system to a normal "passive" mode by re-energizing the opposing complementary suspension legs. The logic network 38 activates and deactivates the suspension legs through the signal path 40.

As will be readily appreciated, the active/passive suspension system discussed above is applicable to increasing the maximum slew rate of single degree of freedom gyros. Frequently the maximum rate within which a gyro can perform is limited by the suspension "bottoming out" against its radial stops. Use of the above-described active/passive suspension arrangement should at least double maximum rate capability by increasing suspension stiffness. An additional application is a use of these principles during gyro compassing involving rapid slewing of the gyro through precisely 180°. Performance (response time) would be improved by the stiffer suspension possible with the present invention.

Another aspect of this invention addresses the unrecognized angular displacement about the input axis between the float and the case that remains once the instrument's suspension is returned to the passive mode. It is desirable to have precise knowledge of the extent to which the float is not in its equilibrium, or precise pointing direction. Because the passive suspension provides relatively weak centering forces, especially at or near equilibrium conditions, the float is somewhat slow in returning to its optimum equilibrium location. Incorporation of an active suspension, however, when the gyro is near its equilibrium position provides pulses of force which in turn create "noise" in the gyro output. A solution to this problem is the utilization of the suspension's read-out system when in the passive suspension mode. The differential voltage across the suspension pair can be calibrated for float angle deviation from equilibrium position. The same logic network 38 that is used to control the active/passive suspension switching can also be utilized to interpolate the output suspension signal into a precise indication of error angle, which can then be utilized as a correction factor in the overall pointing system.

It is thus seen that the objects of this invention have been achieved in that there has been disclosed apparatus for increasing the stiffness of gyro suspensions in the radial direction about the gyro input axis. In one aspect of the invention, current to the radial suspension is continuously monitored, and when this current exceeds a preset value, opposing suspension legs are de-energized. Alternatively, suspension legs may be de-energized when the float position exceeds a preset value away from equilibrium as determined by a direct measurement of float position. Furthermore, monitoring suspension current in the passive mode can be calibrated for float angle deviation from the equilibrium position. It is recognized that modifications and variations of the present invention will occur to those skilled in the art and it is intended that all such modifications and variations be included within the scope of the appended claims.

What is claimed is:

1. In an inertial instrument having a gyro wheel disposed in a float floated in a viscous fluid within a case and including an electromagnetic suspension for maintaining the float at an equilibrium position about the input axis of the gyro, the electromagnetic suspension comprising electromagnets diametrically arranged for producing opposing forces on said float, means for increasing the stiffness of the suspension including, means for determining when the float has moved radially away from an equilibrium position in excess of a predetermined deviation, and circuitry for selectively disabling one of said electromagnets to eliminate the opposing force when the float position exceeds a predetermined deviation from the equilibrium position and for re-enabling said disabled electromagnet when the float position is within the predetermined deviation.

2. The apparatus of claim 1 further including means for measuring float deviation directly.

3. The apparatus of claim 1 further including means for monitoring current drawn by the electromagnetic suspension, the current being related to float deviation.

4. The inertial instrument of claim 1 in which the means for measuring radial deviation includes means for measuring the current in each suspension leg and for disabling the diametrically opposing leg whenever the current exceeds a predetermined value.

5. In an inertial instrument having a gyro wheel disposed in a float floated in a viscous fluid within a case and including an electromagnetic suspension for maintaining the float at an equilibrium position with respect to radial deviation about the input axis of the gyro, the electromagnetic suspension including electromagnets arranged for producing opposing radial forces on said float, apparatus for providing an indication of float angle deviation from said equilibrium position comprising circuitry means for monitoring the level of current to the electromagnetic suspension, the level of current being an indication of float angle deviation.

6. In a pointing system including an inertial instrument having a gyro wheel disposed in a float floated in a viscous fluid within a case with the output axis providing the pointing angle of the instrument and including an electromagnetic suspension for maintaining the float at an equilibrium position about the input axis of the gyro, the electromagnetic suspension including electromagnets arranged for producing opposing forces on said float in response to currents driving said electromagnets, the improvement comprising apparatus for providing a vernier correction to the pointing angle of the pointing system including means for monitoring said currents and means to interpolate the currents to provide a correction factor.

7. In an inertial instrument having a gyro wheel disposed in a float floating in a viscous fluid within a case and including an electromagnetic suspension for maintaining the float at an equilibrium position about the input axis of the gyro, the electromagnetic suspension including electromagnets diametrically arranged for producing opposing forces on said float, the improvement including apparatus for increasing stiffness of the suspension comprising means for sensing and for selectively disabling one of the electromagnets to eliminate the opposing force when the float position exceeds a predetermined value from the equilibrium position and means for sensing and for selectively re-enabling the electromagnets when the float position is within the predetermined value.

8. In an inertial instrument having a gyro wheel disposed in a float floated in viscous fluid within a case and including an electromagnetic suspension for maintaining the float at an equilibrium position about the input axis of the gyro, the electromagnetic suspension including electromagnets arranged for producing opposing forces on said float, the improvement comprising means for determining float angle deviation from said equilibrium position comprising means for monitoring the current to the electromagnetic suspension, and means for translating said monitored current to an indication of float angle deviation.

9. In an improved single degree of freedom gyro arrangement having a gyro wheel disposed in a float floated in a viscous fluid within a case in which an electromagnetic suspension system, comprising an electromagnetic bearing arrangement, supports the float relative to the case, the electromagnetic bearing arrangement comprising a series of electromagnetic segments in cooperative relationship with magnetically permeable rings, the improvement comprising an arrangement for an increasing the suspension stiffness including means for monitoring electrical current in said electromagnetic segments and for sensing current levels according to certain predetermined levels or values at the equilibrium position, and at a deviation from the equilibrium position, means for de-energizing certain predetermined electromagnetic segments in response to sensed current levels exceeding those predetermined levels for the equilibrium position, said de-energizing of such certain electromagnetic segments producing a net effect of increasing the remaining energized suspension segments to produce a greater net resistance to deviation of the float position relative to said case on said magnetic bearing arrangement and for generating a more prompt restoration of the suspension system to the equilibrium position, and means for re-energizing such predetermined de-energized electromagnetic segments in response to sensed current levels being restored to certain predetermined current levels at or near those current levels associated with the equilibrium position.

10. The apparatus of claim 9 further including means for comparing current levels associated with the equilibrium position and those predetermined current levels associated near the equilibrium position and for generating an indication of the deviation angle remaining between the float and the case under such conditions.

11. In a single degree of freedom gyro arrangement of the type in which a gyro wheel is disposed in a float and the float is supported for rotation about the output axis in a viscous fluid within a case through an electromagnetic bearing arrangement having a series of electromagnetic segments in cooperative relationship with magnetically permeable rings, said magnetic segments being energized in a passive mode to support said float in an equilibrium position relative to said case, the improvement comprising, means for monitoring electrical current levels in at least one of said electromagnetic segments and for sensing deviations in current levels from those normally associated with the equilibrium position, means responsive to sensing deviations from current levels normally associated with the equilibrium position for de-energizing at least one of said electromagnetic segments and for producing a net increase in the cumulative effect of the remaining energized suspension segments, such net increase resulting in an increased resistance toward further deviation and an increased response time toward restoration toward the equilibrium position, and means responsive to sensing current levels in an electromagnetic segment diametrically opposed to said de-energized segment approximating current levels normally associated with the equilibrium position and for re-energizing said de-energized electromagnetic segment.

12. Apparatus according to claim 11 further including means for measuring the differential voltages across diametrically opposed suspension leg pairs and for generating a correction factor signal for correcting the error angle of the overall pointing system.

* * * * *